(12) United States Patent
Kuo et al.

(10) Patent No.: US 8,780,291 B2
(45) Date of Patent: Jul. 15, 2014

(54) LIQUID CRYSTAL DISPLAY AND BACKFRAME FOR LIQUID CRYSTAL DISPLAY

(75) Inventors: Yi-cheng Kuo, Guandong (CN); Yu-chun Hsiao, Guandong (CN); Chengwen Que, Guandong (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 98 days.

(21) Appl. No.: 13/578,254

(22) PCT Filed: May 8, 2012

(86) PCT No.: PCT/CN2012/075160
§ 371 (c)(1),
(2), (4) Date: Aug. 10, 2012

(87) PCT Pub. No.: WO2013/159386
PCT Pub. Date: Oct. 31, 2013

(65) Prior Publication Data
US 2013/0286323 A1    Oct. 31, 2013

(51) Int. Cl.
*G02F 1/1333* (2006.01)
(52) U.S. Cl.
USPC .......................................... 349/58; 362/633
(58) Field of Classification Search
CPC ... G06F 1/1633; G06F 1/1656; G06F 1/1658; G06F 1/166; G02F 1/133615; G02F 1/157; G02F 1/1553; G02F 1/133308; G02F 1/1333; G02F 1/1336; G02F 1/133608; G02F 1/1335; G02F 2001/133314; G02F 2001/133317; G02F 2001/133322; G02F 2001/133325; G02F 2201/46; G02F 2201/465; G09F 15/0012; G09F 2007/1843; G09F 7/18; H04N 5/64; H04N 2213/001
USPC ............. 362/97.1, 362, 581, 633; 349/58, 60, 349/65; 112/103; 348/E5.128; 361/679.02; 211/182, 195; 356/240.1
See application file for complete search history.

(56) References Cited

U.S. PATENT DOCUMENTS

| | | | | |
|---|---|---|---|---|
| 7,821,591 B2 * | 10/2010 | Lee | ................................. | 349/58 |
| 2013/0128182 A1 * | 5/2013 | Kuo et al. | ........................ | 349/58 |

\* cited by examiner

*Primary Examiner* — Thoi Duong
(74) *Attorney, Agent, or Firm* — Andrew C. Cheng

(57) ABSTRACT

The present invention discloses a liquid crystal display and a backframe for a liquid crystal display. The backframe is configured by interlinked linkages such that the backframe can be locked in a fully extended position in use, or be collapsible when not in use in a way that the overall dimension of the collapsible backframe is smaller than the fully extended backframe. The backframe can be switched from a fully extended position under normal use, or a collapsible position under a transportation or storage. The collapsible position occupies less volumetric weight as compared to the fully extended position so as to reduce the volumetric weight when the backframe is in transportation and storage. As a result, the performance of the transportation and storage can be therefore increased, while the cost is reduced.

10 Claims, 4 Drawing Sheets

LIQUID CRYSTAL DISPLAY AND BACKFRAME FOR LIQUID CRYSTAL DISPLAY

FIELD OF THE INVENTION

The present invention relates to a technical field of displaying device, and more particularly to a liquid crystal display and a backframe for liquid crystal display.

DESCRIPTION OF PRIOR ART

A liquid crystal display generally includes a front frame, a liquid crystal display panel, and a backlight module. The main configuration of the backlight module includes a backframe and a middle frame. Their main function is to securely position as light source, a waveguide, and an optical film, etc. Most important, they will carry and support the liquid crystal display panel. The backframe and the middle frame also serve as a backbone for the backlight module to strengthen their rigidity. However, while the dimensions of the liquid crystal display vary, the dimensions of both the backframe and the middle frame also vary accordingly.

Currently, the backframe is integrally formed with a planar configuration. The overall dimension of the backframe is almost equivalent to the dimension of the liquid crystal display panel in length and width. Accordingly, the backframe occupies a great deal of volumetric weight during both transportation and storage. Accordingly, the performance of the transportation and storage is quite low because of the volumetric weight each backframe takes. In general, the backframe has to put into a container for revolving. The larger the container, the higher the cost for those backframe occupies larger volumetric weight.

SUMMARY OF THE INVENTION

An objective of the present invention is to provide a liquid crystal display and a backframe for the liquid crystal display so as to resolve the technical issues encountered by the prior arts. The overall dimension and volume of the backframe can be properly compacted so as to reduce its space during transportation and storage. The efficiency of the transportation and storage can be upgraded and the operating cost can be reduced.

In order to resolve the prior art issue, the present invention introduces a technical solution by providing a backframe for a liquid crystal display which comprises a pair of primary struts arranged in parallel to each other. A pair of secondary bars are arranged in parallel to each other and pivotally interlinked to the pair of primary struts by means of pinshafts at ends thereof in a way that the backframe configured by the interlinked primary struts and the secondary bars are collapsible when not in use or fully extended in use such that a compact dimension of the backframe can be achieved when not in use. Wherein a stopper is provided at an interlinked junction of the primary struts and the secondary bars so as to freeze the fully extended position in use. And wherein further comprise a first assisting beam arranged in parallel to the secondary bars, and the first assisting beam is pivotally interlinked to the primary struts via pinshafts.

In order to resolve the prior art issue, the present invention introduces a technical solution by providing a backframe for a liquid crystal display, and the backframe is configured by interlinked linkages such that the backframe can be locked in a fully extended position in use, or be collapsible when not in use in a way that the overall dimension of the collapsible backframe is smaller than the fully extended backframe.

Wherein the interlinked linkage is configured by a pair of primary struts, and a pair of secondary bars pivotally interlinked with pinshafts at ends of the struts and the bars.

Wherein a stopper is provided at an interlinked junction of the primary struts and the secondary bars so as to lock the fully extended position of the primary struts and the secondary bars in use.

Wherein comprises a first assisting beam arranged in parallel to the secondary bars, and the first assisting beam is pivotally interlinked to the primary struts via pinshafts.

Wherein there is two assisting beams, and the backframe further includes a secondary assisting beam which is arranged in parallel to the primary struts, and is pivotally interlinked to those two first assisting beams.

Wherein there are four assisting beams, and the primary struts and the secondary bars are pivotally interlinked to the corresponding assisting beams by corner brackets and pinshafts.

Wherein the backframe includes a pair of first primary struts arranged in parallel under normal use, and a pair of secondary bars arranged in parallel under normal use, and a pair of assisting beams arranged diagonally and being pivotally interlinked with each other by means of a central bracket, and ends of the pair of primary struts and the pair of secondary bars and the assisting beams are pivotally interlinked by means of corner brackets and pinshafts.

Wherein there is four assisting beams, and the backframe further includes a central bracket which is pivotally interconnected with those four assisting beams by means of pinshafts at their ends.

Wherein the backframe further includes four second corner brackets which are pivotally interconnected to the ends of the primary struts, the secondary bars, and the assisting beams by means of pinshafts.

In order to resolve the prior art issue, the present invention introduces a technical solution by providing a liquid crystal display configured with a liquid crystal display panel and a backframe. The backframe is configured by interlinked linkages such that the backframe can be locked in a fully extended position in use, or be collapsible when not in use in a way that the overall dimension of the collapsible backframe is smaller than the fully extended backframe.

The present invention can be concluded with the following advantages. The backframe made in accordance with the present invention is configured by a plurality of linkages pivotally interconnected together, and which makes the backframe be switched from a Bally extended position under normal use, or a collapsible position under a transportation or storage. The collapsible position occupies less volumetric weight as compared to the fully extended position so as to reduce the volumetric weight when the backframe is in transportation and storage. As a result, the performance of the transportation and storage can be therefore increased, while the cost is reduced.

DETAILED DESCRIPTION OF PREFERRED EMBODIMENTS

Figure 1:
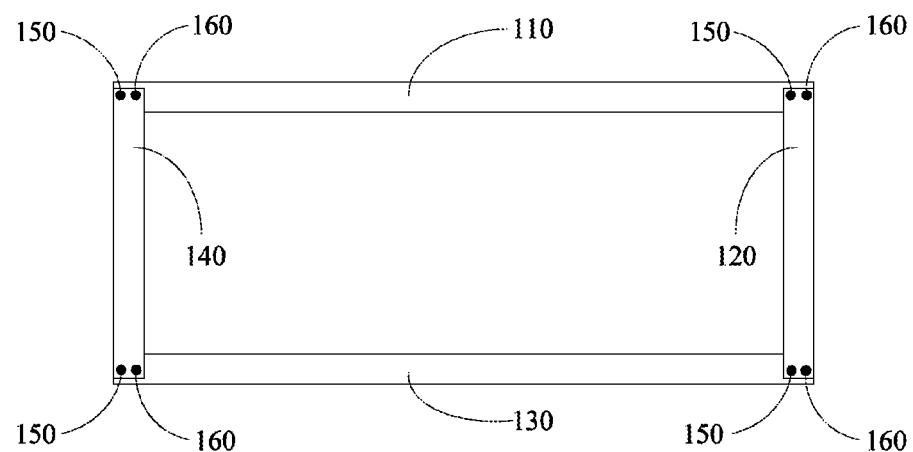
FIG. 1 is a top view showing a backframe made in accordance with a first embodiment of the present invention is locked in a position under normal use.

Referring to FIG. 1, a top view showing a backframe made in accordance with a first embodiment of the present invention is locked in a position under normal use. In this preferred embodiment, the backframe includes a pair of primary struts 110 and 130, a pair of secondary bars 120 and 140. The backframe further includes a plurality of pinshafts 150 and stoppers 160.

In this embodiment, the primary struts 110 and 130, and the secondary bars 120 and 140 are elongated configuration and are pivotally interlinked to configure the backframe for supporting a liquid crystal display. In use, the primary struts 110 and 130, and the secondary bars 120 and 140 can be locked so as to construct a rectangular backframe. Generally, the primary struts 110 and 130 are arranged in parallel to each other, and the secondary bars 120 and 140 are also arranged in parallel to each other. Ends of the primary struts 110 and 130 are pivotally interlinked with ends of secondary bars 120 and 140 by means of the pinshafts 150. Accordingly, every two adjacent primary strut 110 (130) and secondary bars 120 (140) can be pivotally moved with each other. Accordingly, the backframe made therefrom can be switched between a position of normal use, and a collapsible position when not in use or under storage and transportation.

The joints between the primary struts 110 and 130, and the secondary bars 120 and 140 are provided with the stopper 160 such that the relative positions between the primary struts 110 and 130, and the secondary bars 120 and 140 can be locked under normal use. In the present invention, those four joints between the primary struts 110 and 130, and the secondary bars 120 and 140 are provided with the stoppers 160 so as to achieve an excellent result. However, the number of the stoppers 160 can be readily reduced in view of cost and reducing complexity, for example, only one or two stoppers 160 are applied. In the present embodiment, the pinshaft 150 and the stopper 160 can be embodied by screws, rivet, and bolt or any other suitable means facilitating the intended purposes.

Figure 2:
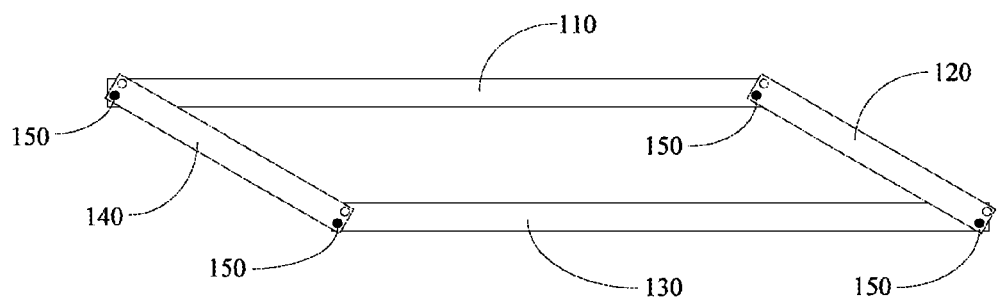
FIG. 2 is a top view showing the backframe in FIG. 1 and is switched to a collapsible position.

Referring to FIG. 2 in which the backframe made according to the first embodiment is switched to a collapsible position. Referring to FIGS. 1 and 2, when the backframe is to switched to its collapsible position, the stopper 160 is removed so as to release the primary struts 110 and 130, and the secondary bars 120 and 140 from its locked position. As a result, the primary struts 110 and 130, and the secondary bars 120 and 140 can move with respect to each other centered on the pinshaft 150, and finally reach to the collapsible position as shown in FIG. 2. It can be readily appreciated that when the backframe is switched to the collapsible position, the volumetric weight is apparently reduced.

Figure 3:
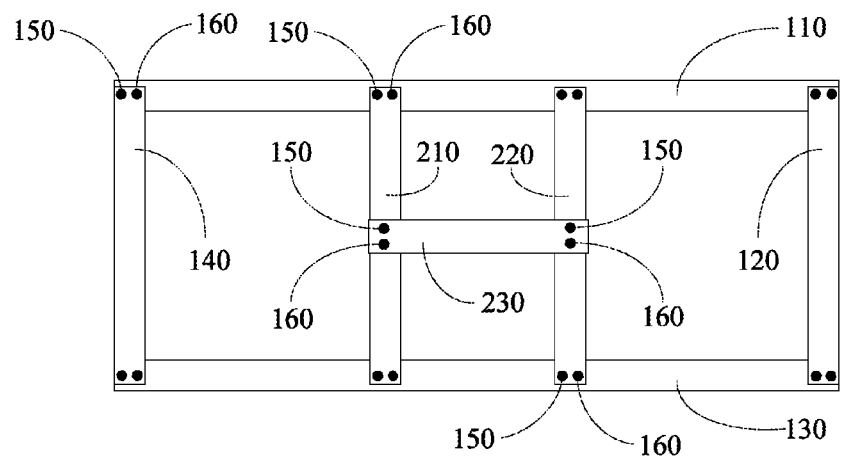
FIG. 3 is a top view showing a backframe made in accordance with a second embodiment of the present invention is locked in a position under normal use.
Figure 4:
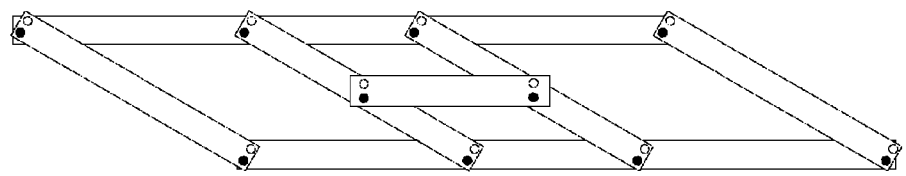
FIG. 4 is a top view showing the backframe in FIG. 3 and is switched to a collapsible position.

Referring to FIGS. 3 and 4, a top view showing a backframe made in accordance with a second embodiment of the present invention is locked in a position under normal use, and a top view of the backframe of second embodiment is switched to a collapsible position are respectively shown. In this preferred embodiment, the backframe includes a pair of primary struts 110 and 130, a pair of secondary bars 120 and 140. The backframe further includes a plurality of pinshafts 150 and stoppers 160, which are similar to the first embodiment. In comparison, the difference between the first and second embodiments resides in that a pair of first assisting beams 210 and 220, and a second assisting beam 230 are incorporated. The first assisting beams 210 and 220 are arranged in parallel with respect to the secondary bars 120, 140, and the second assisting bar 230 is arranged in parallel to the primary struts 110 and 130.

In this embodiment, both ends of the first assisting beams 210 and 220 are pivotally interlinked to the pair of primary struts 110 and 130 by means of the pinshaft 150. Both ends of the second assisting beam 230 are pivotally interlinked to the pair of first assisting beams 210 and 220 by means of the pinshaft 150. The joints between the first assisting beams 210, 220 and the primary struts 110, 130, and the joints between the second assisting beam 230 and first assisting beams 210, 220 are all provided with stopper 160 so as to ensure a better position to freeze the relative movement therebetween. In other embodiment, the number of the first assisting beam and the second assisting beam can be altered according to the actual requirements. For example, there could be only one first assisting beam and multiple second assisting beams, or vise versa. The number of stopper 160 can be also reduced according to actual requirements.

The first assisting beams 210, 220 and the second assisting beam 230 are disposed within a frame configured by the interlinked primary struts 110 and 130, and the secondary bars 120 and 140. In addition, they are arranged in parallel with the primary struts 110 and 130 or the secondary bars 120 and 140. Again, the overall configuration can be switched between a fully extended position, or a collapsible position, such as what disclosed in FIGS. 3 and 4. Once the backframe is switched to the collapsible position, the volumetric weight is apparently reduced.

Figure 5:
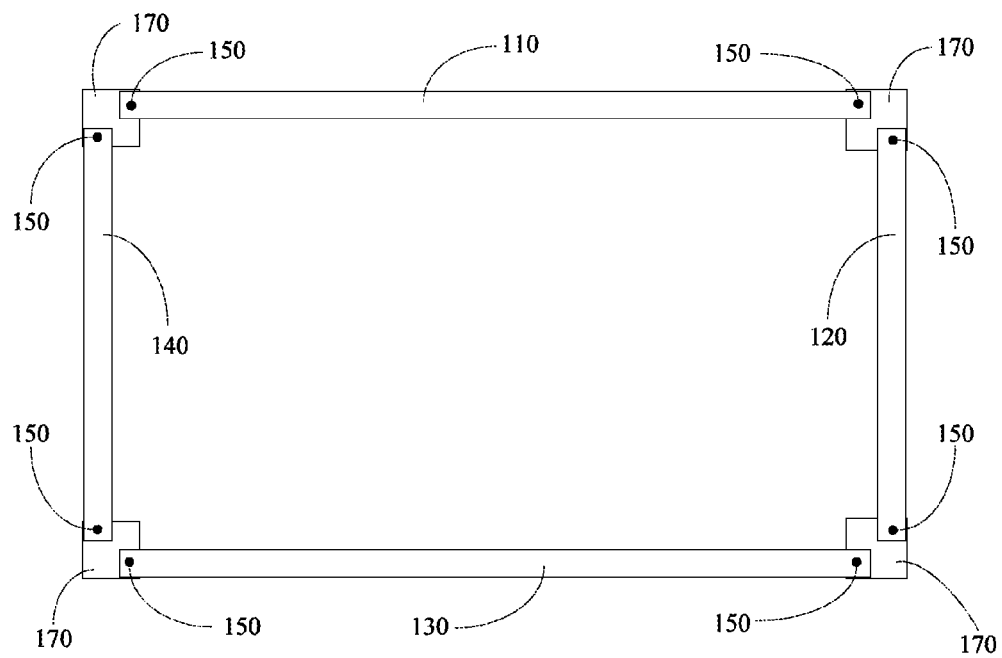
FIG. 5 is a top view showing a backframe made in accordance with a third embodiment of the present invention is locked in a position under normal use.
Figure 6:
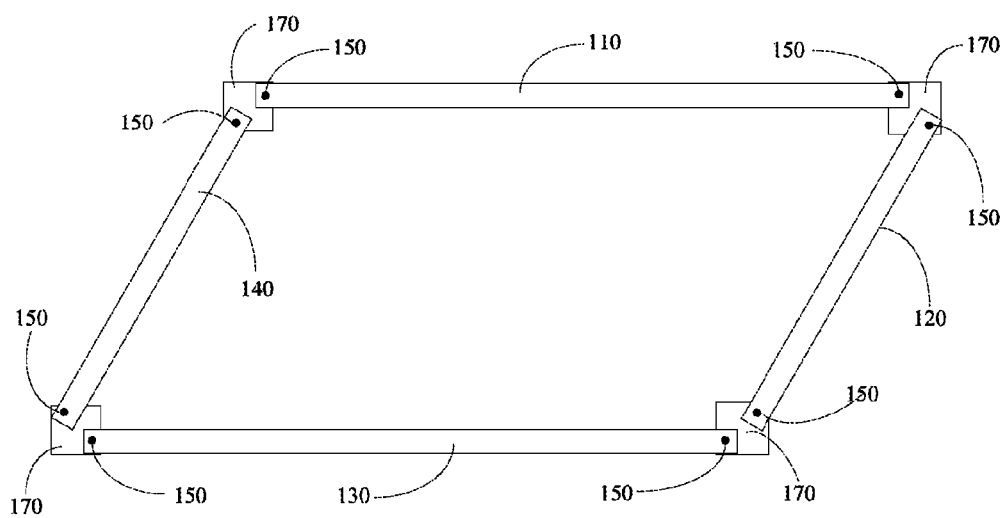
FIG. 6 is a top view showing the backframe in FIG. 5 and is switched to as collapsible position.

Referring to FIGS. 5 and 6, a top view showing a backframe made in accordance with a third embodiment of the present invention is locked in a position under normal use, and a top view of the backframe of second embodiment is switched to a collapsible position are respectively shown. In this preferred embodiment, the backframe includes a pair of primary struts 110 and 130, a pair of secondary bars 120 and 140. In comparison, the difference between the first and third embodiments resides in that four 170 are incorporated. Ends of the primary struts 110 and 130, and the secondary bars 120 and 140 are interlinked with those four corner brackets 170 by means of the pinshaft 150. By this arrangement, the backframe made in accordance with the third embodiment can again switched between a fully extended position and a collapsible position which tremendously reduce the volumetric weight of the backframe.

Figure 7:
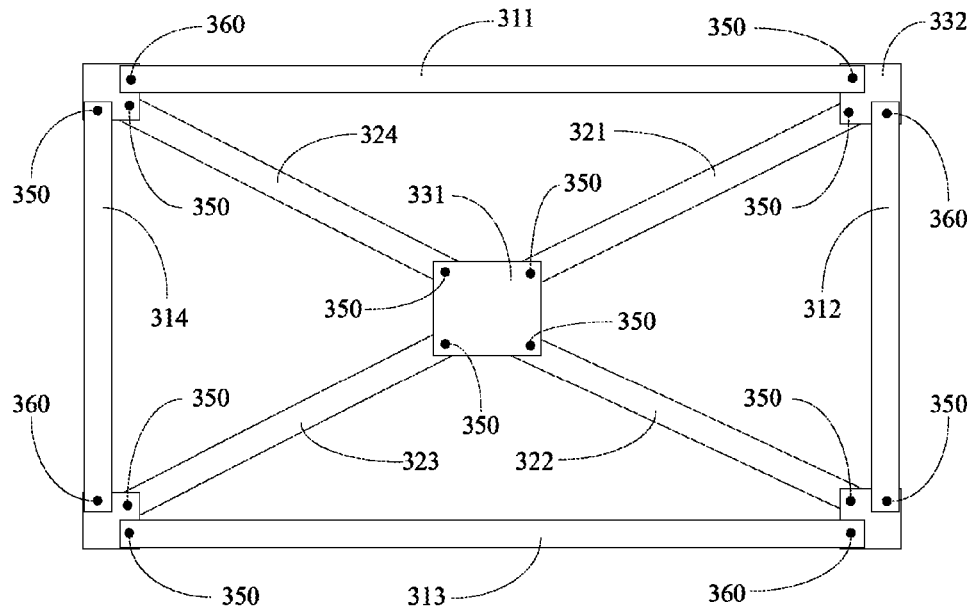
FIG. 7 is a top view showing a backframe made in accordance with a fourth embodiment of the present invention is locked in a position under normal use.

Referring to FIG. 7, a top view of a backframe made in accordance with a fourth embodiment under normal use is shown. In this embodiment, the backframe includes a pair of primary struts 311, 313, and a pair of secondary bars 312, 314, and totally four assisting beams 321, 322, 323, and 324. The backframe is further incorporated with a central bracket 331, and four corner brackets 332, and a plurality of pinshafts 350 and stopper 360.

In use, the primary struts 311 and 313 are arranged in parallel to each other, and the secondary bars 312 and 314 are arranged in parallel to each other. These arrangement configures the backframe of the fourth embodiment. In this embodiment, first ends of the primary struts 311 and 312 and the secondary bars 312 and 314 are interconnected with the corner brackets 332 by means of the pinshaft 350. On the other hand, the other ends of the primary struts 311 and 312 and the secondary bars 312 and 314 are interconnected with the assisting beam 322 by means of the stopper 360. The assisting beams 321, 322, 323, and 324 are interconnected diagonally. An end of the assisting beams 321, 322, 323, and 324 is interconnected to the corner brackets 332 by means of the pinshaft 350, and the other ends are interconnected to the central bracket 331 by means of another pinshaft 350.

Figure 8:
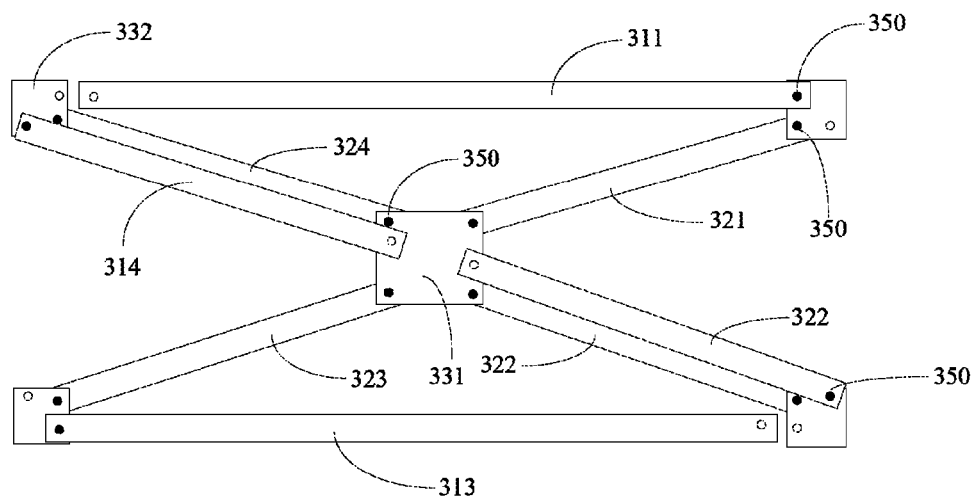
FIG. 8 is a top view showing the backframe in FIG. 7 and is switched to a collapsible position.

Referring to FIG. 8, an illustrational view showing the backframe made in accordance with the fourth embodiment is under collapsible position. When the backframe is switched from its fully extended position to the collapsible position, the stoppers 360 are removed from its position, and the assisting beams 321, 322, 323, and 324 are pivotally moved centered on the central bracket 331. Accordingly, a width of the backframe is reduced and the intended purpose of reducing the volumetric weight is achieved. Meanwhile, the primary struts 311, 313 and the secondary bars 312, 314 are also pivotally moved centered on the pinshaft 350 in a way the ends in which the stoppers 360 rooted, are resolving toward the central bracket 331. In comparison, the difference between the fourth and other above described embodiments is that the assisting beams 321, 322, 323, and 324 are pivotally moved centered on the central bracket 331 so as to realize the fully extended position as shown in FIG. 7, and a collapsible position shown in FIG. 8 which tremendously reduce the volumetric weight of the backframe.

The fourth embodiment can be altered or modified by removing the corner brackets 332. Then, ends of the primary struts 311, 313, and the secondary bars 312, 314 are pivotally interconnected with the four assisting beams 321, 322, 323, and 324 by pinshaft 350. Or alternatively, the assisting beams 321 and 323 can be replaced by other suitable parts, and the assisting beams 322 and 324 can be replaced with other suitable parts. The pinshaft 150 can be used to interconnect them.

In other embodiment, any skilled in the art can readily modify or change any elements within the backframe with paying additional and laborious efforts. With simple and easy replacement of certain parts, the backframe made therefrom can be readily switched between the fully extended position, and the collapsible position. Accordingly, the implementations of the present invention will be not limited to what disclosed in FIG. 1 through FIG. 8.

The present invention further discloses a liquid crystal display monitor which incorporates with any one of the backframes disclosed above.

The present invention can be concluded with the following advantages. The backframe made in accordance with the present invention is configured by a plurality of linkages pivotally interconnected together, and which makes the backframe be switched from a fully extended position under normal use, or a collapsible position under a transportation or storage. The collapsible position occupies less volumetric weight as compared to the fully extended position so as to reduce the volumetric weight when the backframe is in transportation and storage. As a result, the performance of the transportation and storage can be therefore increased, while the cost is reduced.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A backframe for a liquid crystal display, comprising
a pair of primary struts arranged in parallel to each other;
a pair of secondary bars arranged in parallel to each other and pivotally interlinked to the pair of primary struts by means of pinshafts at ends thereof in a way that the backframe configured by the interlinked primary struts and the secondary bars are collapsible when not in use or fully extended in use such that a compact dimension of the backframe can be achieved when not in use;
wherein a stopper is provided at an interlinked junction of the primary struts and the secondary bars so as to lock the fully extended position in use; and
wherein further comprises a first assisting beam arranged in parallel to the secondary bars, and the first assisting beam is pivotally interlinked to the primary struts via pinshafts.

2. A backframe for a liquid crystal display, characterized in that
the backframe is configured by interlinked linkages such that the backframe can be locked in a fully extended position in use, or be collapsible when not in use in a way that the overall dimension of the collapsible backframe is smaller than the fully extended backframe;
wherein the interlinked linkage is configured by a pair of primary struts, and a pair of secondary bars pivotally interlinked with pinshafts at ends of the struts and the bars; and
wherein a stopper is provided at an interlinked junction of the primary struts and the secondary bars so as to lock the fully extended position of the primary struts and the secondary bars in use.

3. The backframe as recited in claim 2, wherein comprises a first assisting beam arranged in parallel to the secondary bars, and the first assisting beam is pivotally interlinked to the primary struts via pinshafts.

4. The backframe as recited in claim 3, wherein there is two first assisting beams, and the backframe further includes a secondary assisting beam which is arranged in parallel to the primary struts, and is pivotally interlinked to those two first assisting beams.

5. The backframe as recited in claim 2, wherein there are four assisting beams, and the primary struts and the secondary bars are pivotally interlinked to the corresponding assisting beams by corner brackets and pinshafts.

6. The liquid crystal display as recited in claim 2, wherein the first primary struts arranged in parallel under normal use, and secondary bars arranged in parallel under normal use, and at least a pair of assisting beams arranged diagonally and being pivotally interlinked with each other by means of a central bracket, ends of the pair of primary struts and the pair of secondary bars and assisting beams are pivotally interlinked by means of corner brackets and the pinshafts.

7. A liquid crystal display configured with a liquid crystal display panel and a backframe, the backframe is configured by interlinked linkages such that the backframe can be locked in a fully extended position in use, or be collapsible when not in use in a way that the overall dimension of the collapsible backframe is smaller than the fully extended backframe;
wherein the interlinked linkage is configured by a pair of primary struts, and a pair of secondary bars pivotally interlinked with corner brackets and pinshafts at ends of the struts and the bars; and wherein a stopper is provided at an interlinked junction of the primary struts and the secondary bars so as to lock the fully extended position of the primary struts and the secondary bars in use.

8. The liquid crystal display as recited in claim 7, wherein further includes four assisting beams arranged diagonally, and the primary struts and the secondary bars are pivotally interlinked to the corresponding assisting beams by the corner brackets and pinshafts.

9. The liquid crystal display as recited in claim 8, wherein the four assisting beams are interconnected by a central bracket.

10. The liquid crystal display as recited in claim 7, wherein the primary struts arranged in parallel under normal use, and the secondary bars arranged in parallel under normal use, and at least a pair of assisting beams arranged diagonally and being pivotally interlinked with each other by means of a central bracket, ends of the pair of primary struts and the pair of secondary bars and the assisting beams are pivotally interlinked by means of the corner brackets and pinshafts.

* * * * *